US 7,840,064 B2

(12) United States Patent
Chhibber et al.

(10) Patent No.: US 7,840,064 B2
(45) Date of Patent: Nov. 23, 2010

(54) METHOD AND SYSTEM FOR AUTOMATIC IDENTIFICATION USING DIGITAL IMAGES

(75) Inventors: Rajeshwar Chhibber, San Jose, CA (US); Ashutosh Chhibber, San Jose, CA (US); Shefali Sharma, Petaluma, CA (US); Shivanjli Sharma, Petaluma, CA (US)

(73) Assignee: BrighTex Bio-Photonics LLC, San Jose, CA (US)

( * ) Notice: Subject to any disclaimer, the term of this patent is extended or adjusted under 35 U.S.C. 154(b) by 1030 days.

(21) Appl. No.: 11/232,454

(22) Filed: Sep. 20, 2005

(65) Prior Publication Data

US 2007/0064978 A1      Mar. 22, 2007

(51) Int. Cl.
 *G06K 9/00*      (2006.01)
(52) U.S. Cl. .................. 382/165; 382/115; 382/170
(58) Field of Classification Search .............. 382/115, 382/118, 128, 170, 165, 100, 103, 203, 283; 600/503, 485, 480, 500; 348/152; 351/205, 351/206
See application file for complete search history.

(56) References Cited

U.S. PATENT DOCUMENTS

| | | | |
|---|---|---|---|
| 4,236,082 A | 11/1980 | Butler | |
| 4,894,547 A | 1/1990 | Leffell et al. | |
| 5,074,306 A | 12/1991 | Green et al. | |
| 5,343,536 A | 8/1994 | Groh | |
| 5,363,854 A | 11/1994 | Martens et al. | |
| 5,836,872 A | 11/1998 | Kenet et al. | |
| 6,141,434 A * | 10/2000 | Christian et al. | 382/103 |
| 6,475,153 B1 * | 11/2002 | Khair et al. | 600/485 |
| 6,533,729 B1 * | 3/2003 | Khair et al. | 600/503 |
| 6,556,708 B1 * | 4/2003 | Christian et al. | 382/165 |
| 6,571,003 B1 | 5/2003 | Hillebrand et al. | |
| 6,611,622 B1 * | 8/2003 | Krumm | 382/170 |
| 2004/0125996 A1 | 7/2004 | Eddowes et al. | |
| 2004/0202685 A1 | 10/2004 | Manzo | |
| 2004/0218810 A1 | 11/2004 | Momma | |

OTHER PUBLICATIONS

Liangen, Zhu et al., "*Human Skin Surface Evaluation by Image Processing*", Proceedings of SPIE, vol. 5254, Third International Conference on Photonics and Imaging in Biology and Medicine, (2003) pp. 362-367.
Sandby-Moller, Jane, "*Influence Of Epidermal Thickness, Pigmentation And Redness On Skin Autofluorescence [para]*" American Society of Photobiology, (Jun. 2003) pp. 1-9.

(Continued)

*Primary Examiner*—Anh Hong Do
(74) *Attorney, Agent, or Firm*—Morgan, Lewis & Bockius LLP; Richard F. Trecartin

(57) ABSTRACT

The present invention provides a method for automatically identifying a person comprises acquiring white-light and UV images of a portion of the person's skin, generating a skin mask from the white-light image, and comparing the skin mask with a pre-stored skin mask of the person. If a substantial match is not found between the two skin masks, the person is not identified, and an error message such as "wrong person" or "person unknown" is returned. Otherwise, the method proceeds to obtain results associated with certain skin conditions using at least the UV image. The results are compared with pre-stored results to determine if the person is the right person or wrong person. A computer readable medium and system are also disclosed.

3 Claims, 18 Drawing Sheets

OTHER PUBLICATIONS

Sboner, Andrea et al., "*Clinical Validation of an Automated System for Supporting the Early Diagnosis of Melanoma*", Skin Research and Technology (2004) vol. 10, pp. 184-192.

Zeng, Haishan, et al., "*Autofluorescence Properties of Skin and Application in Dermatology*" Proceedings of SPIE, vol. 4224 (2000) pp. 366-373.

International Search Report and the Written Opinion of the International Searching Authority dated Nov. 6, 2007.

Hsu, et al., "Face Detection in Color Images," *IEEE Transactions on Pattern Analysis and Machine Intelligence*, 24(5):696-706 (2002).

Kollias, et al., "Optical Non-Invasive Approaches to Diagnosis of Skin Diseases," Oct. *JID Symposium Proceedings*, 7:64-75 (2002).

* cited by examiner

| Color Space | Range for each color channel likely associated with skin pixel | | |
|---|---|---|---|
| | Channel 1 | Channel 2 | Channel 3 |
| RGB | 105 – 255 | 52 – 191 | 32 – 180 |
| YIQ | 66 – 206 | 20 – 77 | 0 – 32 |
| LAB | 132 – 165 | 133 – 150 | 170 – 230 |
| YcBcR | 149 – 200 | 85 – 123 | 80 – 190 |
| HSV | 140 – 255 | 62 – 162 | 0 – 41 |

FIG. 8B

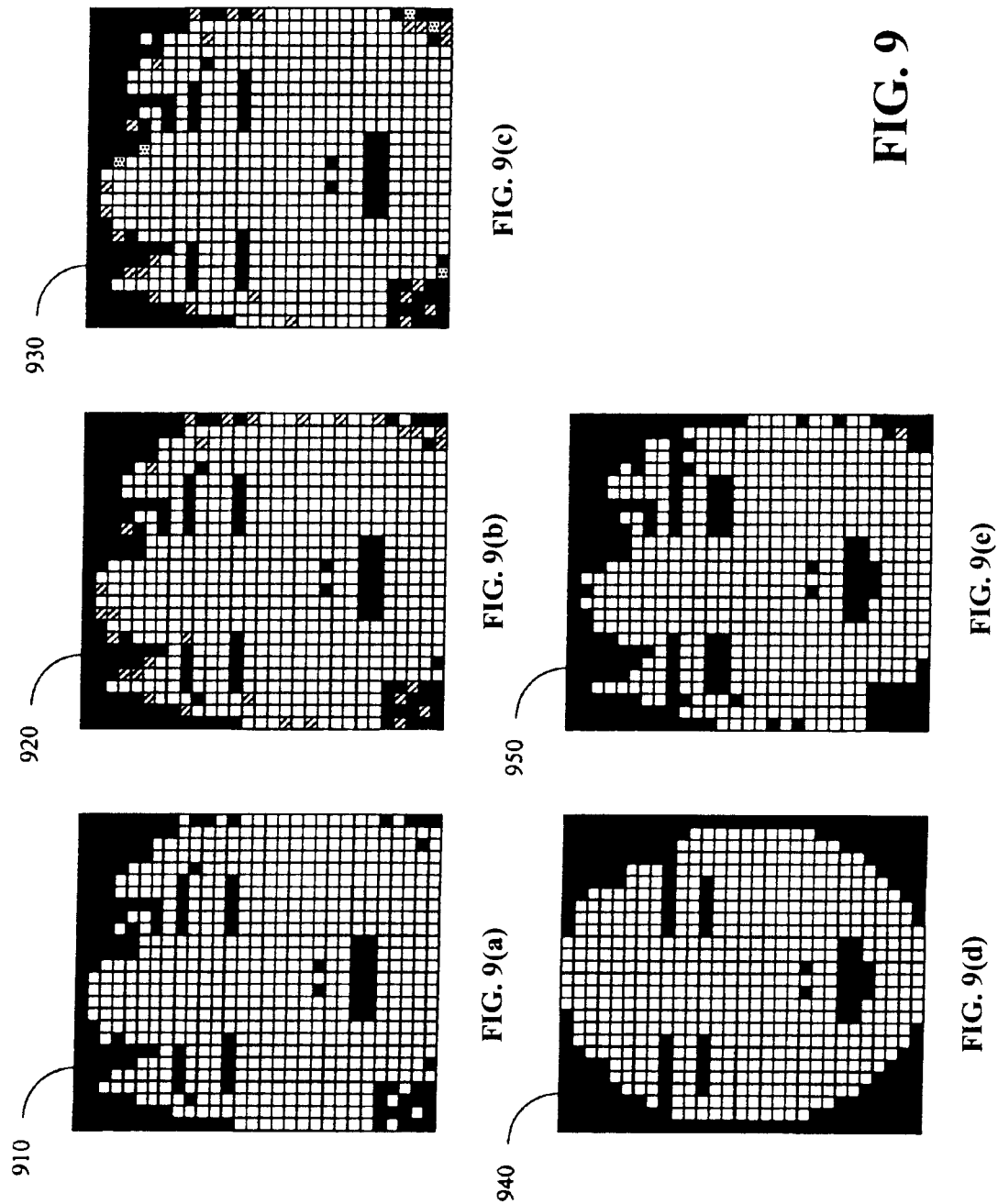

| Skin Condition | Color | Values |
|---|---|---|
| Inflamed Pores | White | Intensity greater than 130 |
| Bacteriostatic pores | Yellow | Intensity greater than 130 |
| Sluggish Oil Flow | Red | Intensity greater than 130 |
| Deeply Inflamed Pores | Bright white | Intensity greater than 130 |

FIG. 13B

METHOD AND SYSTEM FOR AUTOMATIC IDENTIFICATION USING DIGITAL IMAGES

CROSS REFERENCE TO RELATED APPLICATIONS

The present application is related to commonly-assigned patent application Ser. No. 11/232,452 entitled "Method and Systems for Analyzing Skin Conditions Using Digital Images," filed on Sep. 20, 2005, which is incorporated herein by reference in its entirety.

FIELD OF THE INVENTION

The present invention relates in general to digital image acquisition, processing and analysis, and more particularly to automatic identification using digital images.

BACKGROUND OF THE INVENTION

A number of devices for facial recognition are present in the market today, such as the facial recognition systems made by Visionics, Viisage, and Miros. Most of these systems make use of one or both of two main facial feature detection algorithms, eigenface and local feature analysis, and generally work by first recognizing a face in general and then performing feature measurements to find corresponding matches in a data base. To recognize the face in general, multi-scale algorithms are used to search a field of view at a low resolution in order to detect a general facial shape. Once the facial shape is detected, alignment begins in which the head position, size, and pose are determined. An image is then normalized and facial data is translated into unique code, which allows for easier comparison to stored data.

One limitation of the above systems is that the face must be angled at a certain angle, for example, 35 degrees and above, toward the camera for the image to be taken. Furthermore, since most of these systems only examine geometrical shapes, sizes, and locations of facial features, they cannot easily tell the difference between a real person's face and a rubber mode or photograph of the person's face, and can thus be easily fooled by someone attempting to bypass a security system utilizing one of the facial recognition systems. Therefore, there is a need for a more precise facial recognition method and system that are not susceptible to the above types of fraud.

SUMMARY

The present invention provides a method and system for automatic identification (auto-identification). In one embodiment, a method for automatically identifying a person comprises acquiring white-light and ultraviolet (UV) images of a portion of the person's skin, generating a skin mask from the white-light image, and comparing the skin mask with a pre-stored skin mask of the person. If a substantial match is not found between the two skin masks, the person is not identified, and an error message such as "wrong person" or "person unknown" is returned. Otherwise, the method proceeds to obtain results associated with certain skin conditions using at least the UV image. The results are compared with pre-stored results to determine if the person is the right person or wrong person. Since the skin pixels in the UV image often include information in the subsurface of the skin and are indicative of the types of organisms under the skin, the method for auto-matic identification as described above is safeguarded against attempts to defraud an auto-identification system by using a picture or mold because a picture or mode, being made of different materials, would not fluoresce the same way as a person's skin under UV illumination.

In one embodiment, the skin mask is a virtual image or matrix or data group having a plurality of elements, each corresponding to a pixel in the white-light or UV image. In one embodiment, the white-light image is of a first color space, at least one other white-light image is constructed by converting the original white-light image into at least one second color space. For each element in the skin mask, pixel properties of the corresponding pixel in each of the white light images is examined. A first value, such as 255, is assigned to an element in the skin mask if pixel properties of the corresponding pixel in each of the white-light images satisfy predetermined criteria for skin pixels associated with a respective color space, and a second value, such as 0, is assigned to an element in the skin mask if pixel properties in the corresponding pixel in any of the white-light images do not satisfy predetermined criteria for skin pixels associated with a respective color space. Furthermore, some of the elements in the skin mask are predefined non-skin features according to a coordinate reference. These elements are assigned the second value disregarding what values their corresponding pixels in the white-light images have.

After the elements of the skin mask have been assigned the first or second value, each pixel in any of the white-light and UV images that corresponds to an element having the first value in the skin mask would be identified as a skin pixel, and each pixel in any of the white-light and UV images that corresponds to an element having the second value in the skin mask would be identified as a non-skin pixel. Pixels that are identified as non-skin pixels are not considered in obtaining results for the at least one skin conditions.

In one embodiment, the at least one skin condition includes one or more of: skin tone, UV damage, pores, wrinkles, hydration levels, collagen content, skin type, etc., and the skin pixels of one or both of the first white-light and UV images are processed to obtain the results for the skin conditions.

In one embodiment, each skin pixel of the white-light and UV images includes values associated with three color channels, and the UV damage results are computed based on values associated with one of the three color channels in the skin pixels of the first UV image.

In another embodiment, a standard deviation is computed for each of the three color channels based on values associated with a respective one of the three color channels in the skin pixels of the white-light image, and the standard deviations for the three color channels, or their average value, is used to as a quantitative measure of the skin tone.

In a further embodiment, a color value and an intensity value associated with each of the skin pixels in the first UV image are computed and examined against a look-up table to see if they correspond to a specified skin condition. For each skin pixel in the UV image that has color and intensity values falling within predetermined ranges for a specified skin condition, surrounding skin pixels are examined for the specified skin condition to determine a size of a skin area adjacent the skin pixel and having the specified skin condition. For example, the specified skin condition may include a plurality of types of pores, and for each skin pixel in the UV image that has color and intensity values falling within predetermined ranges for each of the plurality of types of pores, a size of a pore is determined by examining surrounding skin pixels to determine if they belong to a same pore, and the pores are counted to obtain a pore count for each type and or all types of pores.

According to embodiments of the present invention, the system for auto-identification using digital images generally includes an image acquisition device, at least one light source coupled to the image acquisition device, and a computing device coupled to the image acquisition device and to the light source, and a display coupled to the computing device. The computing device includes modules for carrying out different aspects of the method for auto-identification as summarized above and described in more detail below. The modules may be in hardware or software or combinations of hardware and software. In one embodiment, the computing device includes a microprocessor and a memory device coupled to the microprocessor, and the modules include software programs stored as program instructions in a computer readable medium associated with the memory device.

BRIEF DESCRIPTION OF THE DRAWINGS

FIG. 8B is a table listing ranges of pixels values for different color channels for each of a plurality of color spaces that are used to identify skin pixels.

FIGS. 9($a$) to ($e$) are simplified block diagrams illustrating a method for generating a skin mask according to one embodiment of the present invention.

FIG. 13B is a table listing pixel color and intensity associated with different skin conditions.

DETAILED DESCRIPTION

Figure 1:
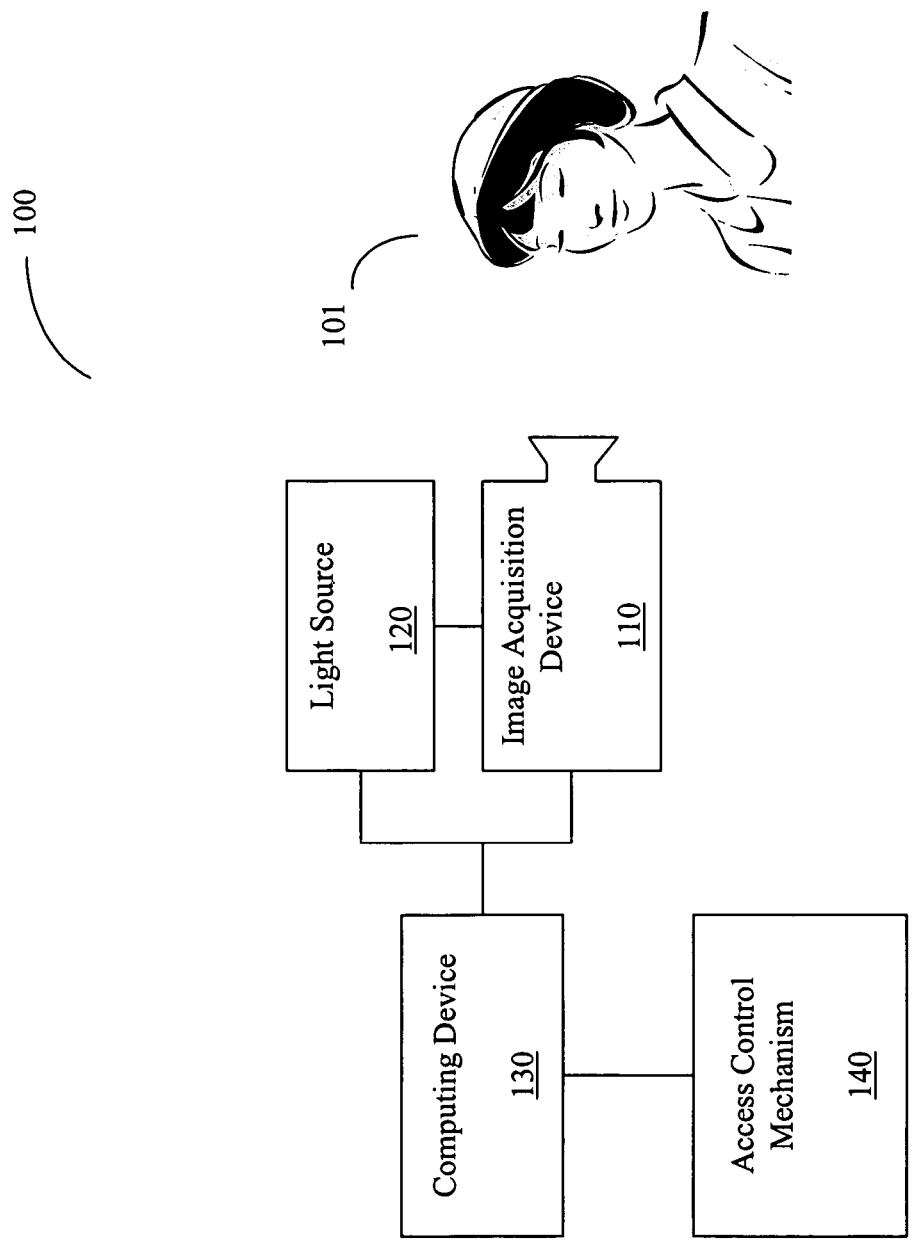
FIG. 1 is a simplified block diagram of a system for auto-identification according to embodiments of the present invention.

FIG. 1 depicts a simplified block diagram of a system 100 for auto-identification As shown in FIG. 1, system 100 includes an image acquisition device 110, at least one light source 120 coupled to the image acquisition device 110, a computing device 130 coupled to the image acquisition device 110 and to the at least one light source either directly or through the image acquisition device 110, a display 140 coupled to the computing device 130, and optionally a printer 150 also coupled to the computing device. System 100 is configured to acquire digital images of a subject 101 for analysis, such as a person's face, and to process the digital images to automatically identify the person.

In one embodiment, as shown in FIG. 2, the image acquisition device 110 is part of a digital camera 200 having an image sensor 112 and an optical assembly 114 in front of the image sensor 112 and configured to form an image of the subject 101 on the image sensor 114. The image sensor 114 may include, for example, 3-5 million of pixels made of photon detecting devices, such as charge-coupled devices (CCD). Each pixel includes three subpixels corresponding to three different color channels. In one embodiment, the number of pixels used in the image sensor 114 to capture the white-light and UV images can be varied.

Figure 2A:
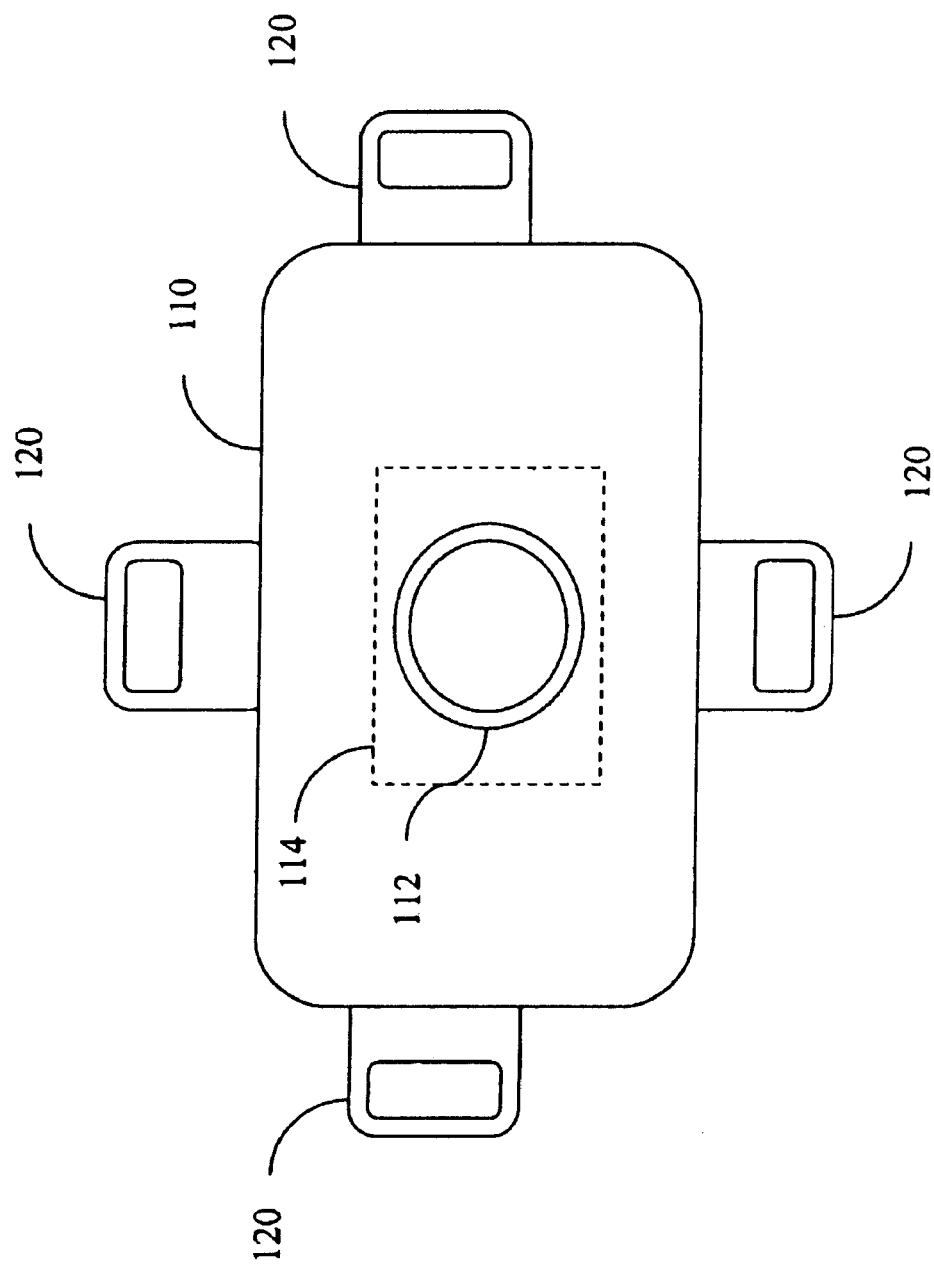
FIG. 2A is a line drawing of an image acquisition device in the system shown in FIG. 1 according to one embodiment of the present invention.

FIG. 2A also shows a plurality of light sources 120 as parts of the digital camera 200, including, for example, two flash light sources 120 on two sides of the camera, a flash light source 120 on top of the camera, and optionally another flash light source 120 at the bottom of the camera. Having more than one flash light sources 120 allows more uniform exposure of the subject 101 to light during imaging and to allow different light sources to be configured to emit different color or wavelength of light, but the number of light sources 120 and their positions in system 100 can be varied without affecting the general performance of the system. In one embodiment, a portion of the light sources 120 are configured to illuminate the subject 101 with white light, and another portion of the light sources 120 are configured to emit ultraviolet (UV) light.

Digital camera may also include other parts or components that are not shown, such as a shutter, electronics for allowing the computing device 130 to control the shutter and flashings from the light sources 120, and electronics for outputting captured images to the computing device 130 for analysis, etc. To prevent saturation of the pixels in the image sensor 114, camera 200 may also include anti-blooming devices.

Figure 2B:
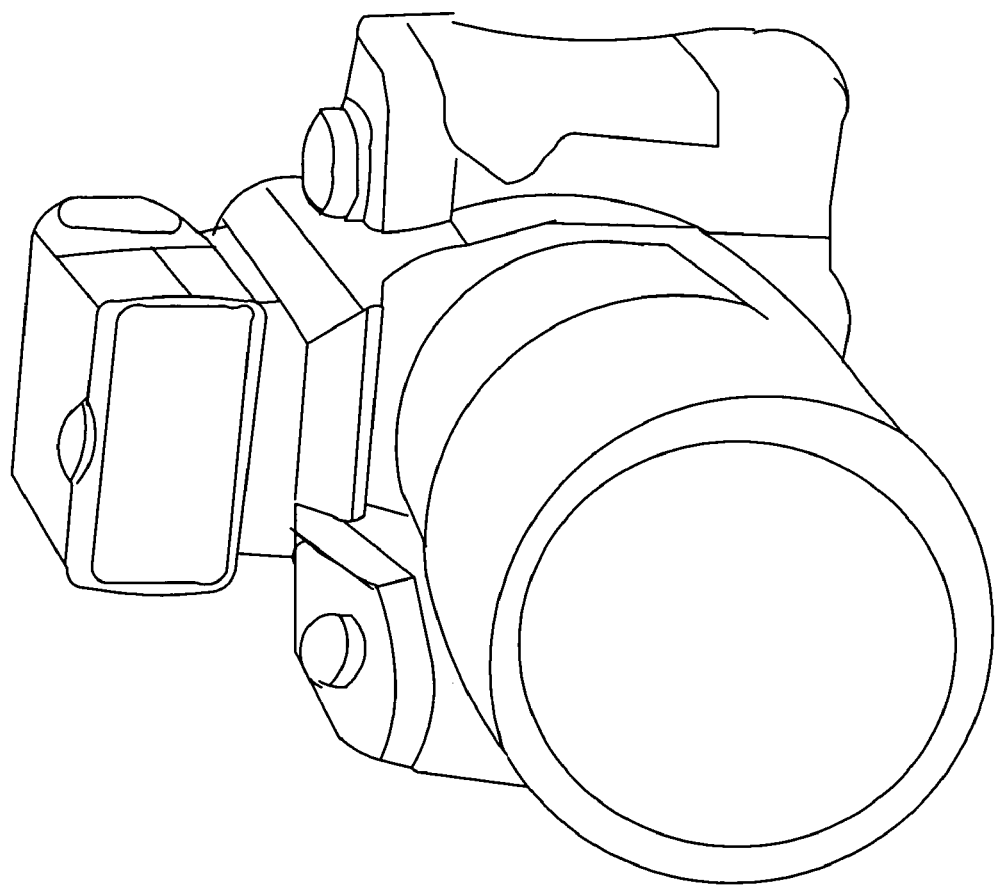
FIG. 2B is a line drawing of a three-dimensional view of a conventional image acquisition device that can be converted into the image acquisition device shown in FIG. 2A.
Figure 3B:
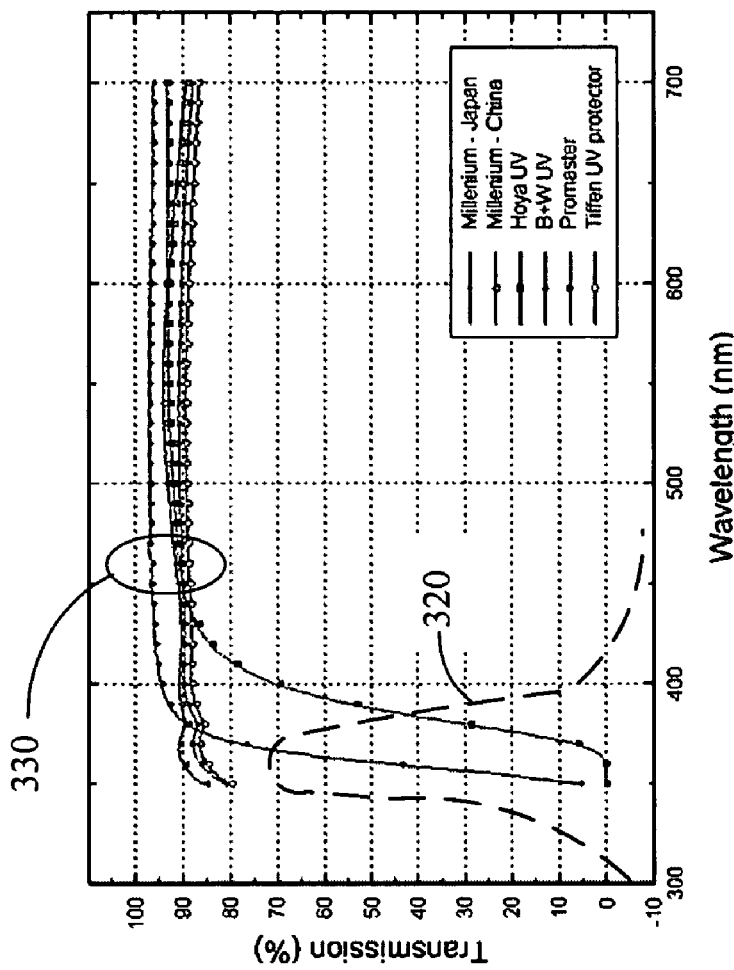
FIG. 3B is a chart illustrating a transmission spectrum of a UV bandpass filter as compared with transmission spectra of other white-light filters.
Figure 3A:
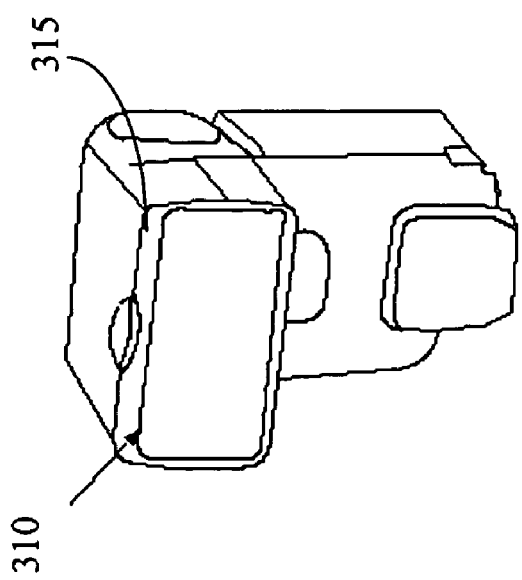
FIG. 3A is a line drawing of a flash light source in the system shown in FIG. 1 according to one embodiment of the present invention.

In one embodiment, camera 200 is converted from a conventional, off-the-shelf digital camera, such as the one shown in FIG. 2B, by adding the light sources 120 on the sides and the bottom. In one embodiment, the light sources 120 that are on the top and at the bottom of the camera 200 are white light sources and the light sources 120 on the sides are UV light sources. The white light sources can be conventional off-the-shelf flash light sources, such as the flash light source 300 shown in FIG. 3. Each of the UV light sources 120 can be one converted from light source 300 by changing a low-pass filter 310 in front of the light source 300 into a UV filter 310. In one embodiment, as shown in FIG. 3B, the UV filter is a bandpass filter that provides a transmission spectrum 320 having a width of about 50 nm and a peak wavelength of about 365 nm. In comparison, the low-pass filter 310 would provide a transmission spectrum, such as the ones shown in FIG. 3B as spectra 320, that drop sharply to near zero in the UV wavelength range and stay relatively flat in the visible wavelength range. In addition to the white-light and UV filters, some or all of the light sources 120 may also have infrared absorption filters 315 installed. The infrared absorbing filters help to prevent heat from the light source to be applied to the subject by filtering out wavelengths greater than, for example, 700 mm.

Figure 4:
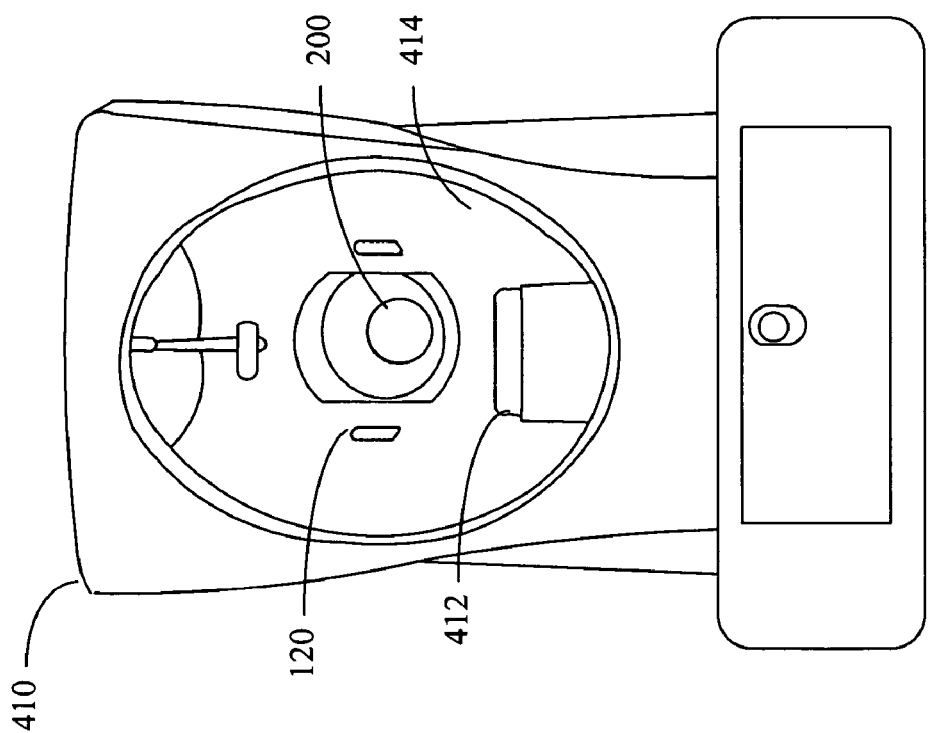
FIG. 4 is a line drawing of an imaging box on which the image acquisition device show in FIG. 2 is installed.

Camera 200 may be installed in an imaging box, such as box 410 shown in FIG. 4, which helps to prevent ambient light from entering the sensor 212 of the camera and interfering with the analysis of skin conditions. FIG. 4 also shows camera 200 placed near a center in the back of the box 410, light sources 120 on top and sides of the optical assembly 214, and a pedestal or chin rest 412 near an opening 414 of the box on which the subject 101 can rest and stay still during imaging.

Figure 5:
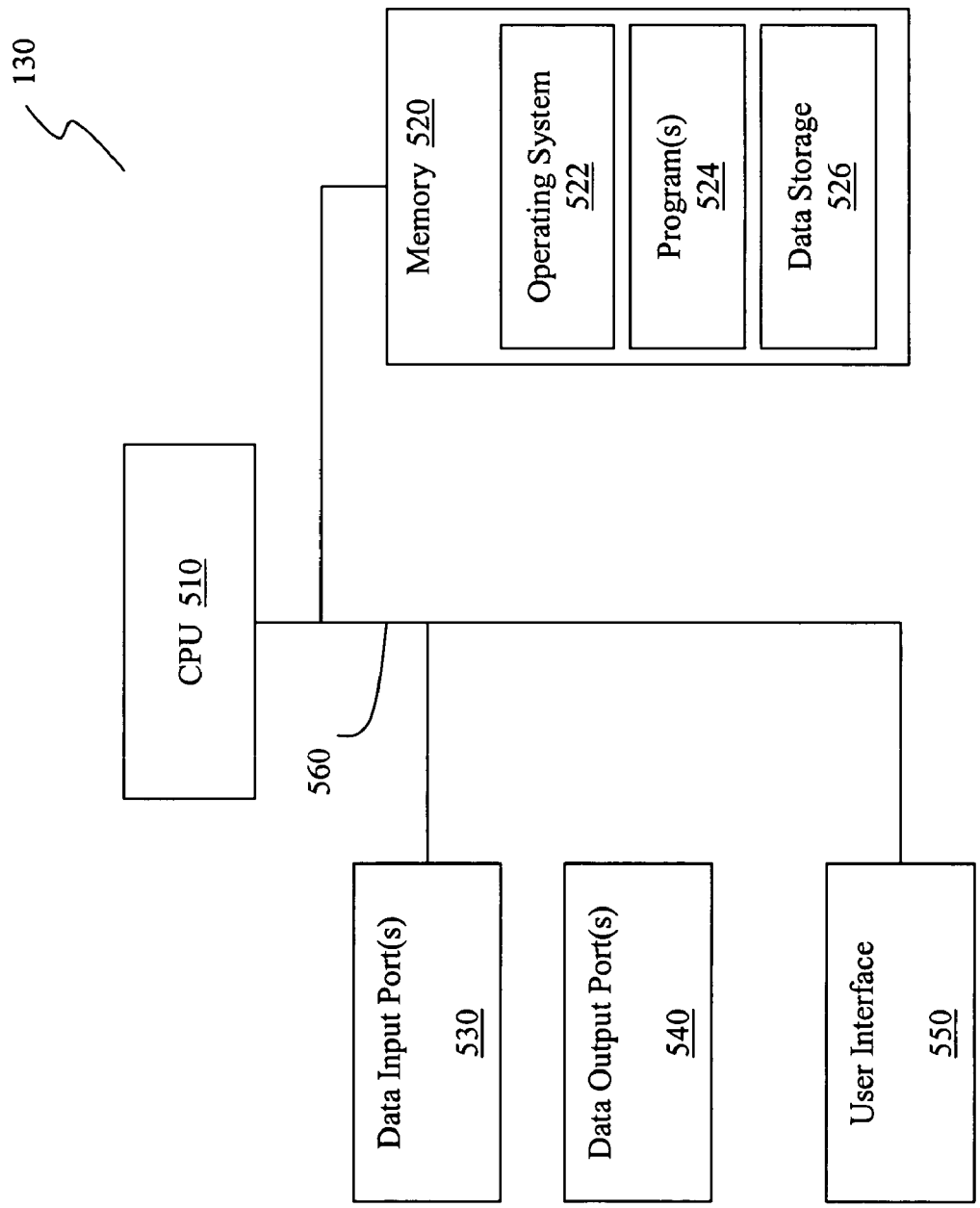
FIG. 5 is a simplified block diagram of a computing device in the system illustrated in FIG. 1 according to one embodiment of the present invention.

In one embodiment of the present invention, as shown in FIG. 5, the computing device 130 can be any computing device having a central processing unit (CPU) 510, a memory unit 520, at least one data input port 530, at least one data output port 540, and a user interface 550, interconnected by one or more buses 560. Memory unit 520 preferably stores operating system software 522 and other software programs including a program 524 for auto-identification. Memory unit 520 further includes a data storage unit 526 for storing image data transferred from the camera 200 through one of the at least one data input port 530 and for storing prior skin condition results associated with the subject and other data or data structures generated during current execution of the programs 524, as discussed below. Programs 524 may be organized into modules each includes coded instructions, which, when executed by the CPU 510, cause the computing device 530 to carry out different aspects, modules, or steps of a method for automatically identifying a person according to one embodiment of the present invention. All of part of the memory unit 520, such as the database 526, may reside in a different geographical location from that of the CPU and be coupled to the CPU through one or more computer networks.

Programs 524 may also include a module including coded instructions, which, when executed by the CPU 510, cause the computing device 530 to provide graphical user interfaces (GUI) for a user to interact with the computing device 530 and direct the flow of the programs 524.

Figure 6:
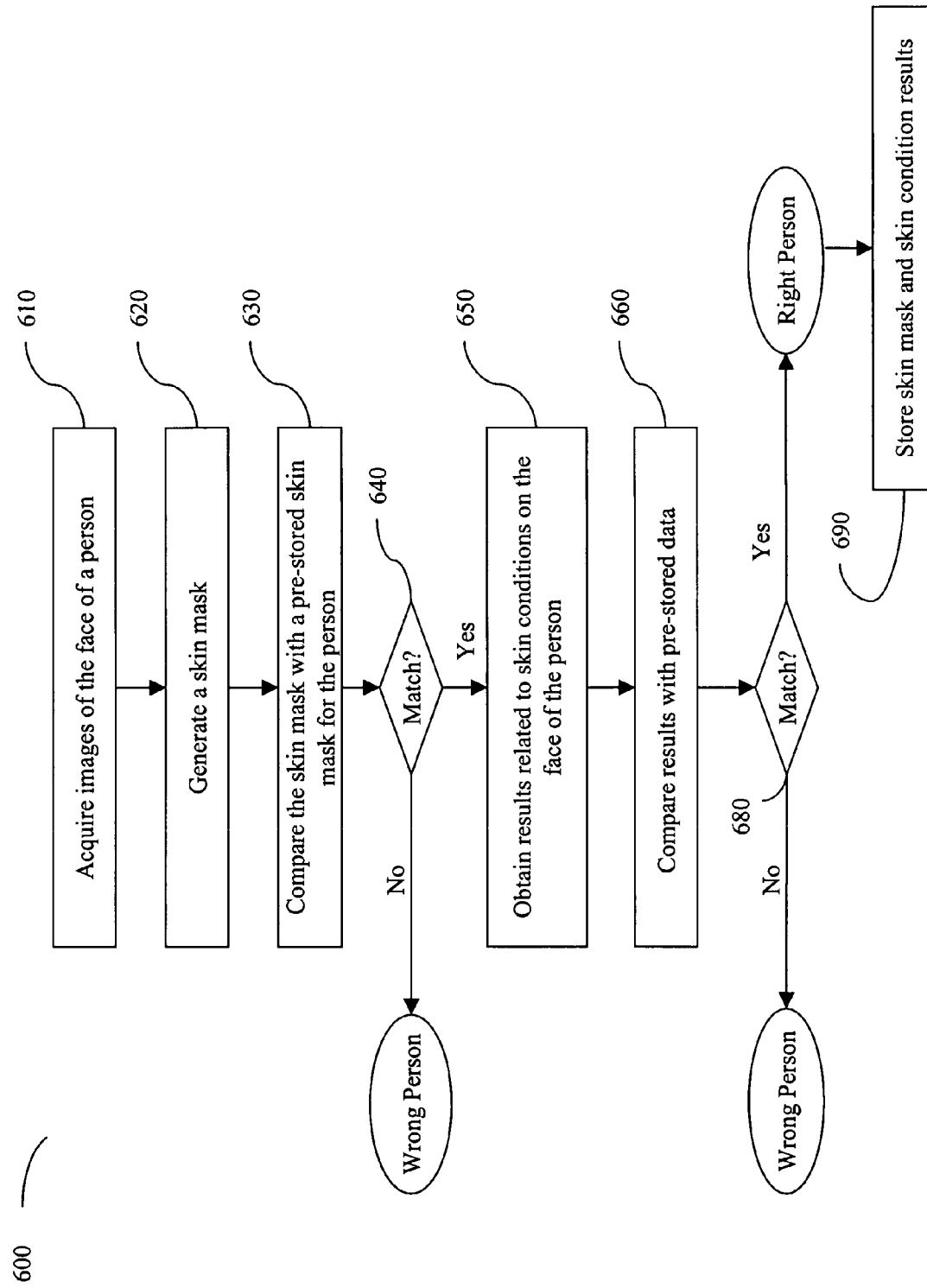
FIG. 6 is a flowchart illustrating a method for auto-identification using digital images according to one embodiment of the present invention.

FIG. 6 is a flowchart illustrating a method 600 for automatically identifying a person using digital images according to one embodiment of the present invention. As shown in FIG. 6, method 600 comprises a module 610 in which digital images including a first white-light image and a first UV image of the subject are acquired, a module 620 in which a skin map or skin mask is generated from the first white-light image, a module 630 in which the skin mask is compared with a pre-stored skin mask of the person, and a module 640 in which a decision is made regarding whether the two skin masks substantially match. The match does not have to be perfect. As a non-limiting example, a substantial match is found if more than 70-90% of the elements in the two skin masks match.

If a substantial match is not found between the two skin masks, the person is not identified, and an error message such as "wrong person" or "person unknown" is returned. Otherwise, the method proceeds to module 650 to obtain results associated with certain skin conditions using at least the UV image. In subsequent modules 660 and 680, the database 526 is consulted to compared the current results with pre-stored data in the database 526, and a decision is made whether the person is the right person or wrong person based on the comparison. If it is determined that the person is the right person, a module 690 interacts with the database 526 to store the newly obtained skin mask and the results associated with the skin conditions for future reference, in additional to or in place of the prestored data. If it is determined that the person is the right person, an error message such as "wrong person" or "person unknown" is returned.

Modules 620 through 640 related to the skin map or skin mask is optional, system 100 may be used to identify a person based just on the skin conditions obtained in module 650.

Figure 7:
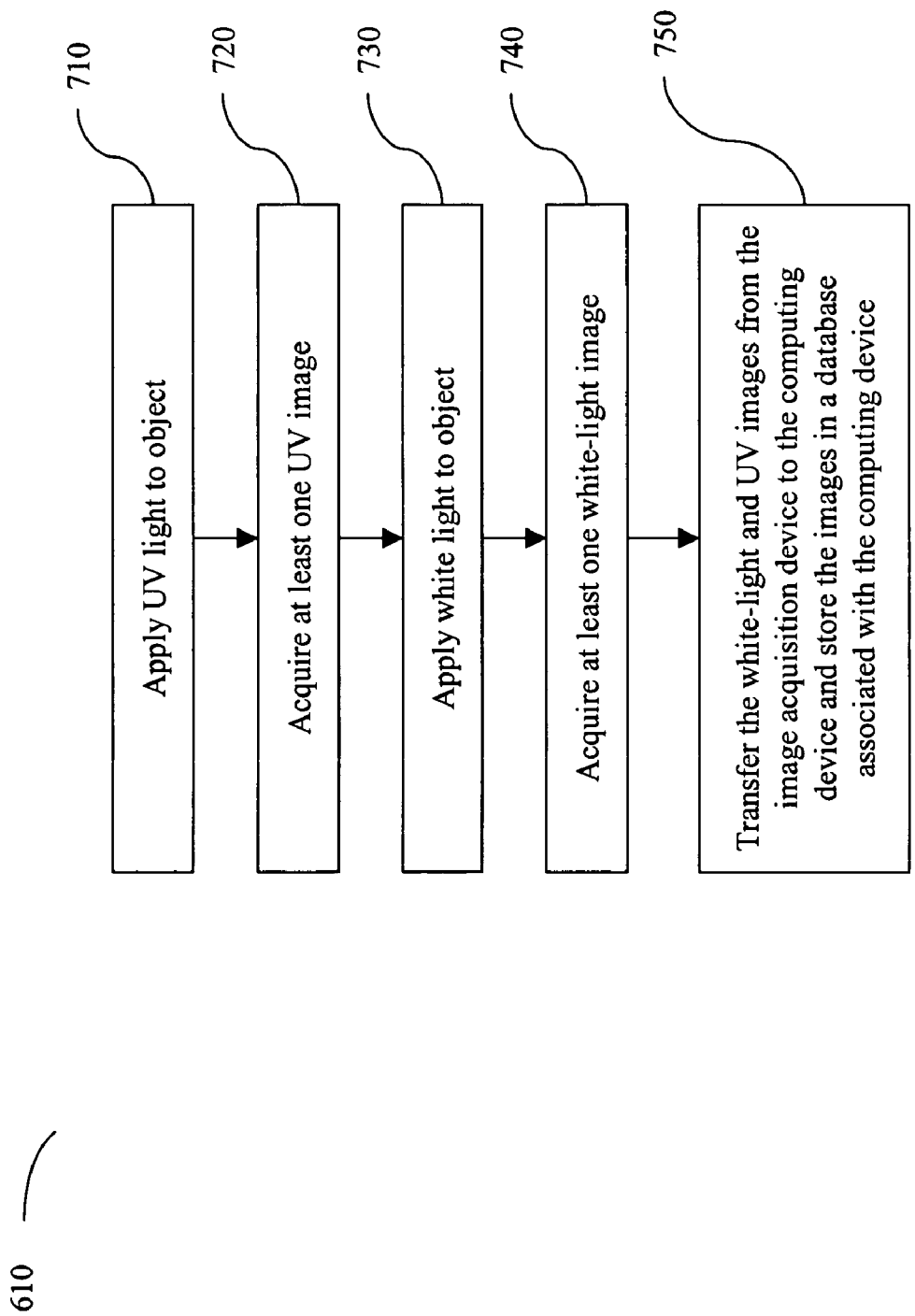
FIG. 7 is a flowchart illustrating process steps for acquiring digital images of a body surface according to one embodiment of the present invention.
Figure 8A:
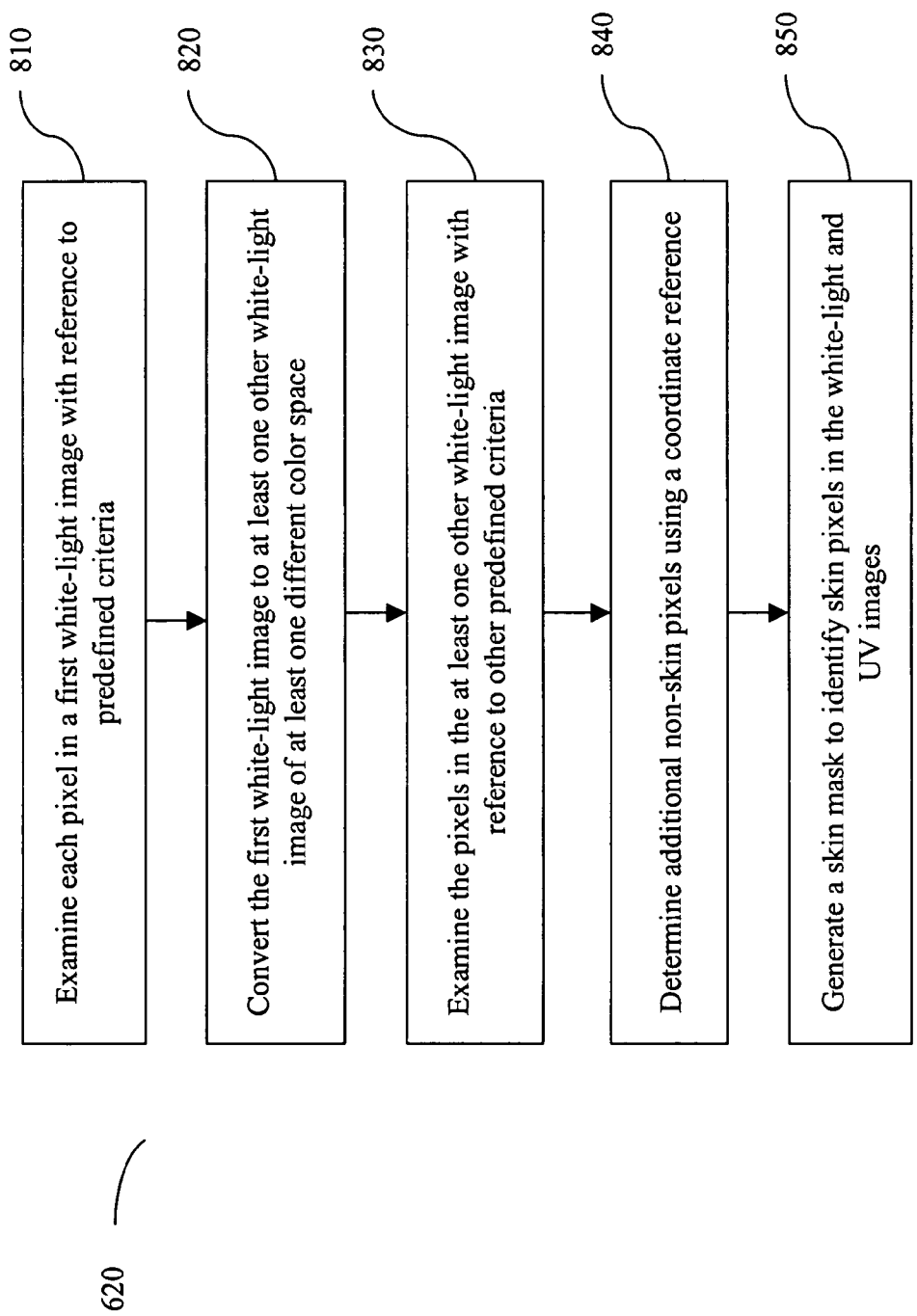
FIG. 8A is a flowchart illustrating process steps for generating a skin map according to one embodiment of the present invention.

FIG. 7 illustrates process steps in the module 610 for acquiring the digital images of the subject 101 according to one embodiment of the present invention. As shown in FIG. 8A, module 710 includes a step 710 in which the UV light sources 120 are turned on to send a flash of UV light to the subject 101. At about the same time, the shutter of the camera is opened at step 720 so that the first UV image is captured by the sensor 114. The application of ultraviolet (UV) light to dermatology and health care has been researched and utilized in order to aid in the detection and diagnosis of a number of afflictions and skin disorders. Given that most living organisms fluoresce upon excitation through the absorption of light, a phenomenon known as autofluorescence, it has been shown that different organisms can be classified through their Stokes shift values. Stokes shift is the difference between peak wavelength or frequency of an absorption spectrum and peak wavelength or frequency of an emission spectrum. Furthermore, UV light can penetrate deeper into the skin than visible light, making it possible to detect subsurface skin conditions (i.e., skin conditions below the and allowing for early diagnosis of melanoma and other skin cancer symptoms. Therefore, by acquiring the first UV image, the embodiments of the present invention is able to combine the knowledge of autofluorescence of the skin and image processing technologies to results related to subsurface skin condition, as described in more detail below. By taking the UV image, method 600 is also safeguarded against attempts to defraud the auto-identification system 100 by using a picture or mold because a picture or mode, being made of different materials, would not fluoresce the same way as a person's skin, meaning the materials would not fluoresce with the same spectrum in comparison to skin.

Module 610 further includes a step 730 in which the white light sources 120 are turned on to send a flash of white light to the subject 101. At about the same time, the shutter of the camera is opened at step 740 so that the first white-light image is captured by the sensor 114. Module 610 further includes a step 750 in which the white-light and UV images are transferred from the camera 200 into the computing device 130 using conventional means and stored in the database 526 for subsequent processing, and in which appropriate image conversion and/or initial processing are performed as discussed above.

Each of the white-light and UV images includes a plurality of pixels. Each pixel in the white-light or UV image corresponds to a pixel in the sensor 114. Furthermore, each pixel in the UV image corresponding to a respective pixel in the white-light image, and vise versa. In one embodiment, each of the pixels in the sensor 114 includes three subpixels corresponding to three color channels for sensing three color components in a received light signal. Thus, each pixel in the white-light and UV image also includes values associated with the three color channels, which are referred to sometimes in this document as pixel values. The pixel values may range, for example, between 0 and 255.

The images captured by the sensor 114 and the images used by the computing device 130 may be of different formats. An appropriate image conversion software may be used by the computing device 130 to convert an image format, such as BMP, TIFF, or FITS, used by the camera 200 to another image format used by the computing device 130. The images from the camera, after any conversion, may be initially processed by the computing device 130 using conventional techniques for dark current and/or intensity correction, image manipulation or enhancement, and/or to take off some pixels that clearly do not carry any information for identification, before being used for analyzing skin conditions. Thus, each of the acquired digital images, such as the white-light and UV images, is referred to as either the original image acquired by the camera or an image derived from the original image after one or more format or color space conversions, and some initial processing such as those stated above.

Generally, the subject 101, or part of it, that is captured in the images include both skin and non-skin portions, such as hair, clothing, eyes, lips, nostrils, etc. Furthermore, some of the objects surrounding the subject 101 may also be captured in the images. Therefore, the pixels in the first white-light and UV images often include both skin pixels, which correspond to pixels in the sensor 114 that have captured signals from the skin portions of the subject 101, and non-skin pixels, which correspond to pixels in the sensor 114 that have captured signals from non-skin portions of the subject 101 or from objects surrounding the subject 101. The skin mask can be used to help identify the skin pixels and non-skin pixels in the white-light and UV images.

FIG. 8A is a flowchart illustrating the process steps in the module 620 for generating the skin mask. As shown in FIG. 8A, module 620 includes a step 810 in which properties of each pixel in the white-light image are examined with reference to predefined criteria for skin pixels. The properties of a pixel may include the pixel values, the pixel's position in the image, and/or pixel values of one or more corresponding pixels in one or more other images (as discussed below). The criteria for skin pixels may be different for different color spaces, as illustrated in FIG. 8B, which lists, for each of a plurality of color spaces, ranges of values associated with different color channels for likely skin pixels. For example, assuming the first white-light image being in a first color space, such as the red-green-blue (RGB) color space, pixels that have the red channel (channel 1) values in the range of 105-255, the green channel (channel 2) values in the range of 52-191, and the blue channel (channel 3) values in the range of 32-180 are likely to be skin pixels. Thus, as shown in FIG. 9(a), after examining the pixels in the first white-light image 910, part of the pixels in the first white-light image 910 are considered to be possible or likely skin pixels, as illustrated by the white blocks in FIG. 9(a), and the rest of the pixels in the first white-light image 910 are determined to be non-skin pixels, as illustrated by the black blocks in FIG. 9(a).

To be more accurate in constructing the skin mask, module 620 further includes a step 820 in which the first white light image 910 is converted to at least one other white light images in at least one other color space, such as white-light image 920 in a second color space illustrated in FIG. 9(b), and white-light image 930 in a third color space illustrated in FIG. 9(c). Each pixel in the at least one other white-light image corresponds to a respective pixel in the first white-light image. The first, second, and third color spaces can be different color spaces selected from commonly known color spaces, such as the RGB, YIQ, LAB, YcBcR, and HSV color spaces, and/or proprietary color spaces.

Module 620 further includes step 830 in which each of the at least one other white light images, the pixels corresponding the likely skin pixels in the first white-light image 910 are further examined against criteria for skin pixels associated with the respective color space. For example, in the second white-light image 920, all pixels corresponding to non-skin pixels in the first white-light image 910 are determined to be non-skin pixels and are illustrated in FIG. 9(b) as black blocks, and pixels corresponding to likely skin pixels in the first white-light image 910 are further examined against criteria for skin pixels associated with the second color space. As a result, more pixels would be determined as non-skin pixels, which are shown in FIG. 9(b) as blocks with stripes. The rest of the pixels in the second white-light image 920 are considered to be likely skin pixels and are illustrated by the white blocks in FIG. 9(b).

Furthermore, in the third white-light image 930, all pixels corresponding to non-skin pixels in the second white-light image 920 are determined to be non-skin pixels and are illustrated in FIG. 9(c) as black blocks and blocks with stripes, and pixels corresponding to likely skin pixels in the second white-light image 920 are further examined against criteria for skin pixels associated with the third color space. As a result, more pixels would be determined as non-skin pixels, which are shown in FIG. 9(c) as blocks with dots. The rest of the pixels in the third white-light image 920 are considered to be likely skin pixels and are illustrated by the white blocks in FIG. 9(c). This may continue until a last one of the at least one other white-light image is examined.

To be even more accurate in identifying the skin pixels and to make sure that non-skin pixels are not considered in analyzing the skin conditions, module 620 may include a further step 840 in which a coordinate reference or template 940, such as the one shown in FIG. 9(d) is used to classify more of the likely skin pixels as non-skin pixels. The coordinate reference or template 940 may be prestored in the database 526 together with a plurality of other coordinate reference in the memory unit 520 of the computing device 130, and selected as being a suitable one for the subject 101. The coordinate reference defines certain pixels in any of the white-light images as non-skin pixels (shown as black blocks) based on their coordinates or positions in the image. So if any of the likely skin pixels in the last one of the at least one other white-light image have coordinates that are defined as coordinates for non-skin features in the coordinate reference 940, these pixels are deemed to be non-skin pixels. The rest of the likely skin pixels in the last one of the at least one other white-light image are finally identified as skin pixels, and all of the pixels in each of the other white-light images or the UV image that correspond to the skin pixels in the last one of the at least one other white-light image are also identified as skin pixels. The rest of the pixels in each of the white-light or UV images are considered as non-skin pixels.

Module 720 further includes a step 850 in which the skin map or skin mask is generated. In one embodiment of the present invention, as shown in FIG. 9(e), the skin map 950 includes a matrix having a plurality of matrix elements, each corresponding to a pixel in any of the white-light or UV images of the subject 101. Those matrix elements corresponding to skin pixels in each of the white-light and UV images (shown as white blocks in FIG. 9(e)) are defined as skin elements, and each is assigned a first value. In contract, those matrix elements corresponding to non-skin pixels (shown as black blocks in FIG. 9(e)) are defined as non-skin elements, and each is assigned a second value that is distinct from the first value. In one embodiment, the first value is a large number, such as 255, and the second value is a small number, such as 0.

Figure 10:
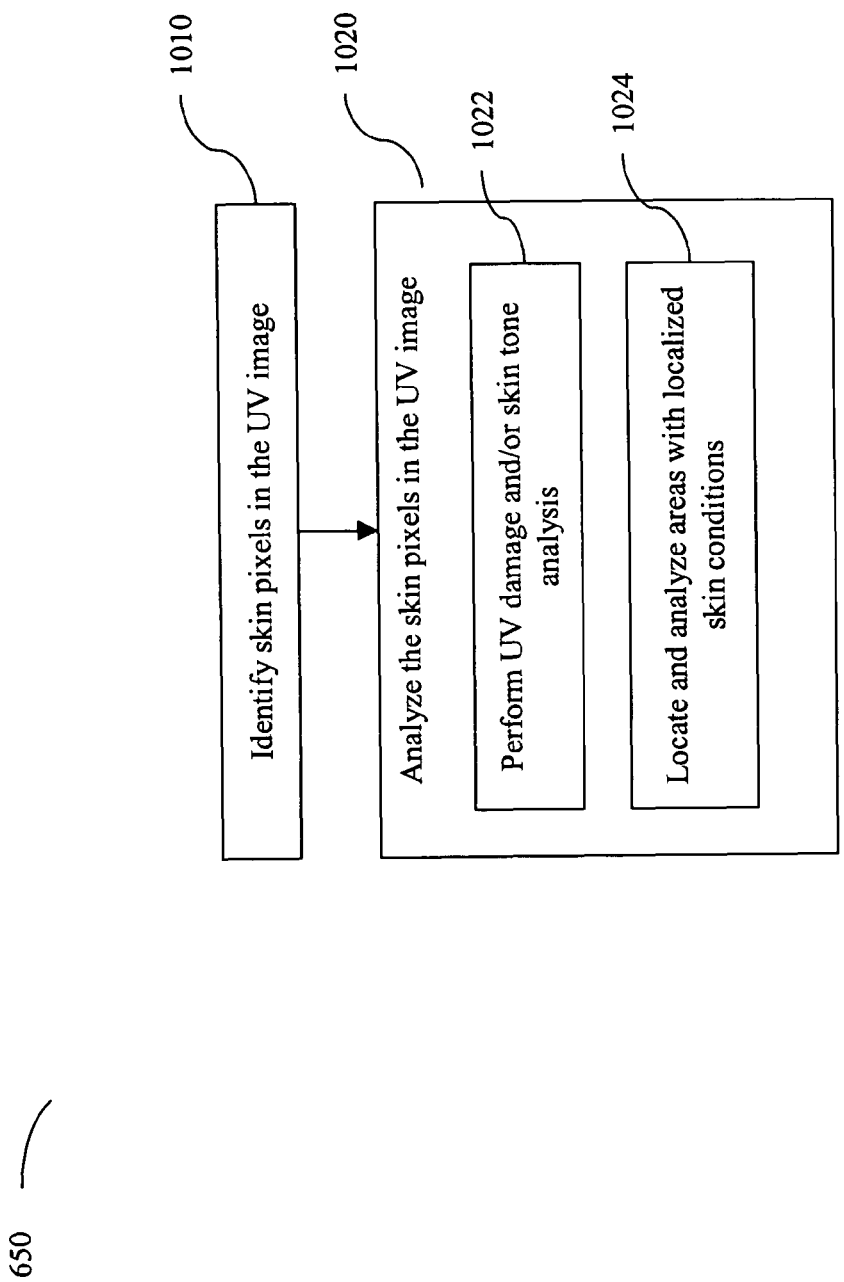
FIG. 10 is a flowchart illustrating process step for obtaining skin condition results according to one embodiment of the present invention.

Since non-skin pixels may interfere with the analysis of skin conditions, they are identified and/or extracted in step 650 before the skin condition results are obtained. Thus, as shown in FIG. 10, module 650 in method 600 includes a step 1010 for identifying, on a pixel by pixel basis, skin pixels and/or non-skin pixels in the white-light and/or UV image. Whether a pixel in any of the white-light and UV images is a skin pixel can be easily determined by looking up the value contained in the corresponding element in the skin map 950. Since generating the skin mask is optional, without the skin mask, the method steps for determining skin pixels described above can be used in module 650 to determined the skin pixels. Module 650 further includes submodules 1020 obtaining results associated with at least one skin condition by analysing information in the skin pixels in the white light and UV images. Submodules 1020 may include submodules 1022 for performing UV damage and skin tone analysis, and submodules 1024 for locating and quantifying certain skin conditions, such as one or more types of pores, wrinkles, etc. Submodules 1020 may also include submodules for examining other skin conditions, such as hydration levels, collagen content, skin type, moles, pigmentation, level of oil flow, and/or any or the other skin conditions identifiable using the information in one or both of the white-light and UV images according to knowledge known to those familiar with the art.

Figure 11:
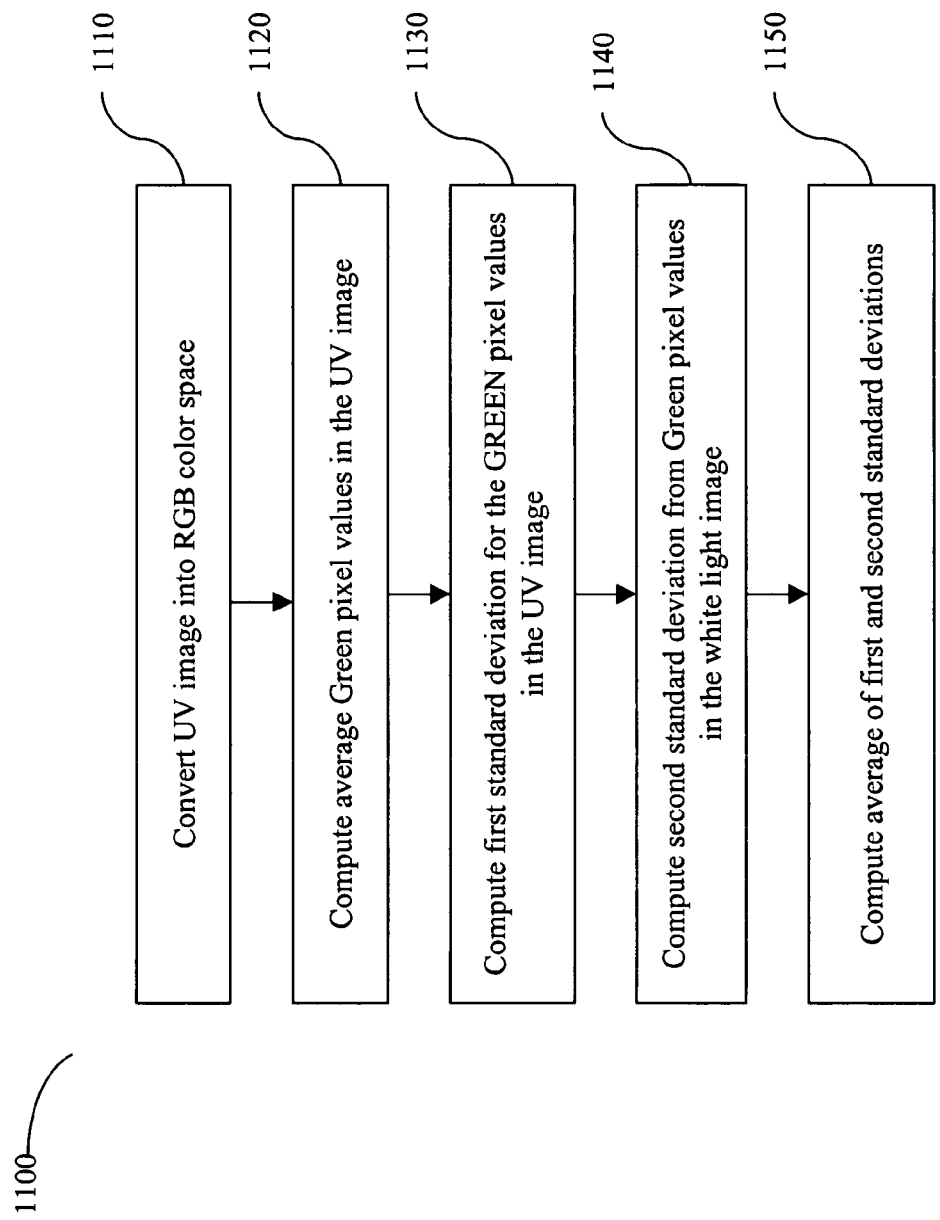
FIG. 11 is a flowchart illustrating process steps for obtaining UV damage results from the digital images according to one embodiment of the present invention.

In one embodiment of the present invention, submodules 1022 include a submodule 1100 for obtaining UV damage results using the skin pixels in at least the first UV image, as illustrated in FIG. 11. Submodule 1100 includes a step 1110 in which the first UV image, if it is not in the RGB color space, is converted into a second UV image in the RGB color space, a step 1120 in which an average is computed from all of the Green channel values in the skin pixels of the first UV image or in the second UV image if a conversion is made in step 1110, and a step 1130 in which a first standard deviation is computed from the Green channel values in the skin pixels. The first standard deviation value can be used to indicate quantitatively the amount of UV damage in the skin of the subject 101. Alternatively or additionally, submodule 1100 may include a further step 1140 in which a second standard deviation is computed from the Green channel values in the skin pixels of one of the white-light image, and an average of the first and second standard deviation values can be used to indicate quantitatively the amount of UV damage in the skin of the subject 101.

Figure 12:
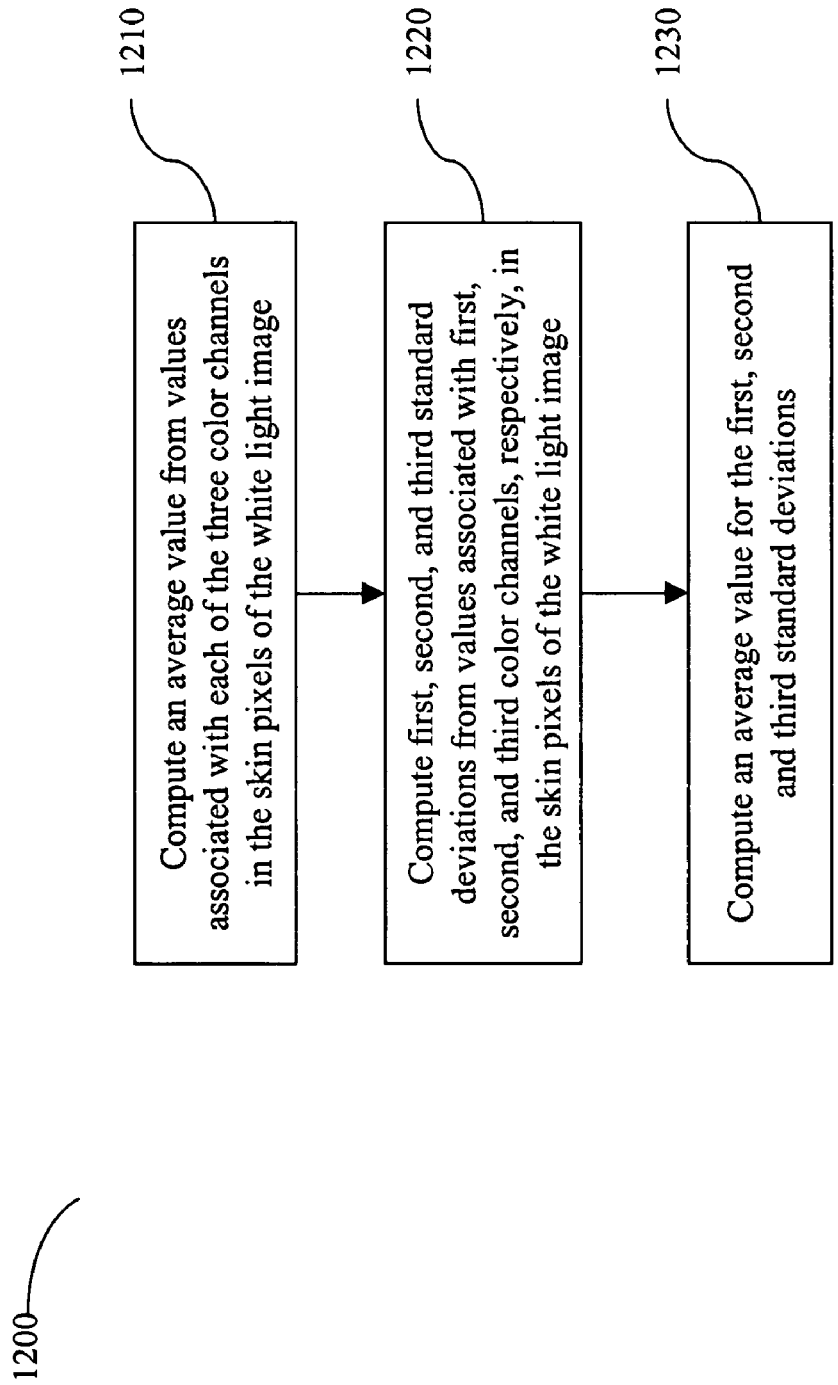
FIG. 12 is a flowchart illustrating process steps for obtaining skin tone results from the digital images according to one embodiment of the present invention.

In one embodiment of the present invention, submodules 1022 includes a submodule 1200 for obtaining skin tone results using the skin pixels in any of the white light image, as illustrated in FIG. 12. Submodule 1200 includes a step 1210 in which an average is computed from values associated with each of the three color channels in the skin pixels of the white-light image, a step 1220 in which a standard deviation is computed for each of the color channels in the skin pixels, and a step 1230 in which an average of the standard deviation values computed in step 1220 is obtained as a measure of the skin tone of the subject 101. Since skin tone may be easily changed by applying makeup, use of the skin tone results for auto identification may be optional or as a reference.

Figure 13A:
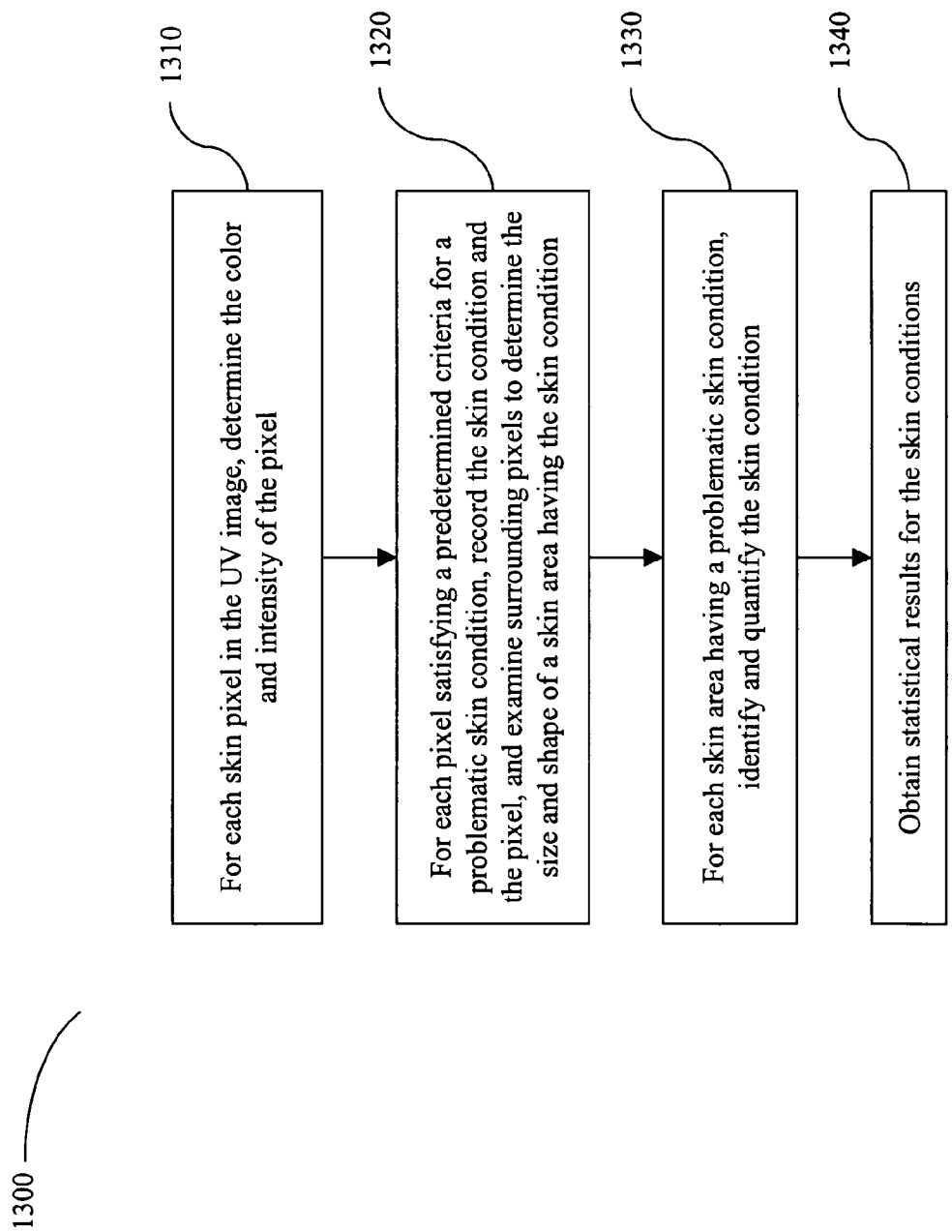
FIG. 13A is a flowchart illustrating process steps for obtaining results related to certain localized skin conditions according to one embodiment of the present invention.

In one embodiment of the present invention, submodules 1024 includes a submodule 1300 for obtaining results related to certain skin conditions, as illustrated in FIG. 13A. Submodule 1300 includes a step 1310 in which color and intensity values are computed from the pixel values associated with each pixel in one of the UV images, and a step 1320 in which the color and intensity values for each pixel are examined with reference to at least one lookup table to determine if the pixel satisfy criteria for any of a plurality of skin conditions listed in the at least one lookup table. The at least one lookup table may include those compiled using knowledge known in the art, or through proprietary research and/or empirical studies.

FIG. 13B illustrate an exemplary lookup table that may be included in the at least one lookup table. For example, if a first skin pixel has a white color and an intensity value exceeds 130, the skin pixel is likely one of a group of contiguous pixels that have captured fluorescence coming from an inflamed pore upon illumination by a UV flash. To confirm, surrounding skin pixels are also examined to see if some of them are also white in color and have intensity values over 130. If none or few of the pixels satisfy this criteria, the first skin pixel is not associated with an inflamed pore. Otherwise, an inflamed pore is identified, and in step 1330, the number of skin pixels associated with the inflamed pore is determined as a measure for the size of the pore on the subject 101, and an average of the intensity value associated with the number of skin pixels is computed as a quantitative indication of the severity of the pore. Submodule 1300 further includes a step 1340 in which statistical results such as a total number of all types of pores, and/or a total number of each of the several types of pores listed in FIG. 13B are computed.

Note that FIG. 13B only illustrates some examples of the criteria that can be used by module 1300. Alternatively or additionally, module 1300 may use other lookup tables derived from information such as those known in the art.

Figure 14:
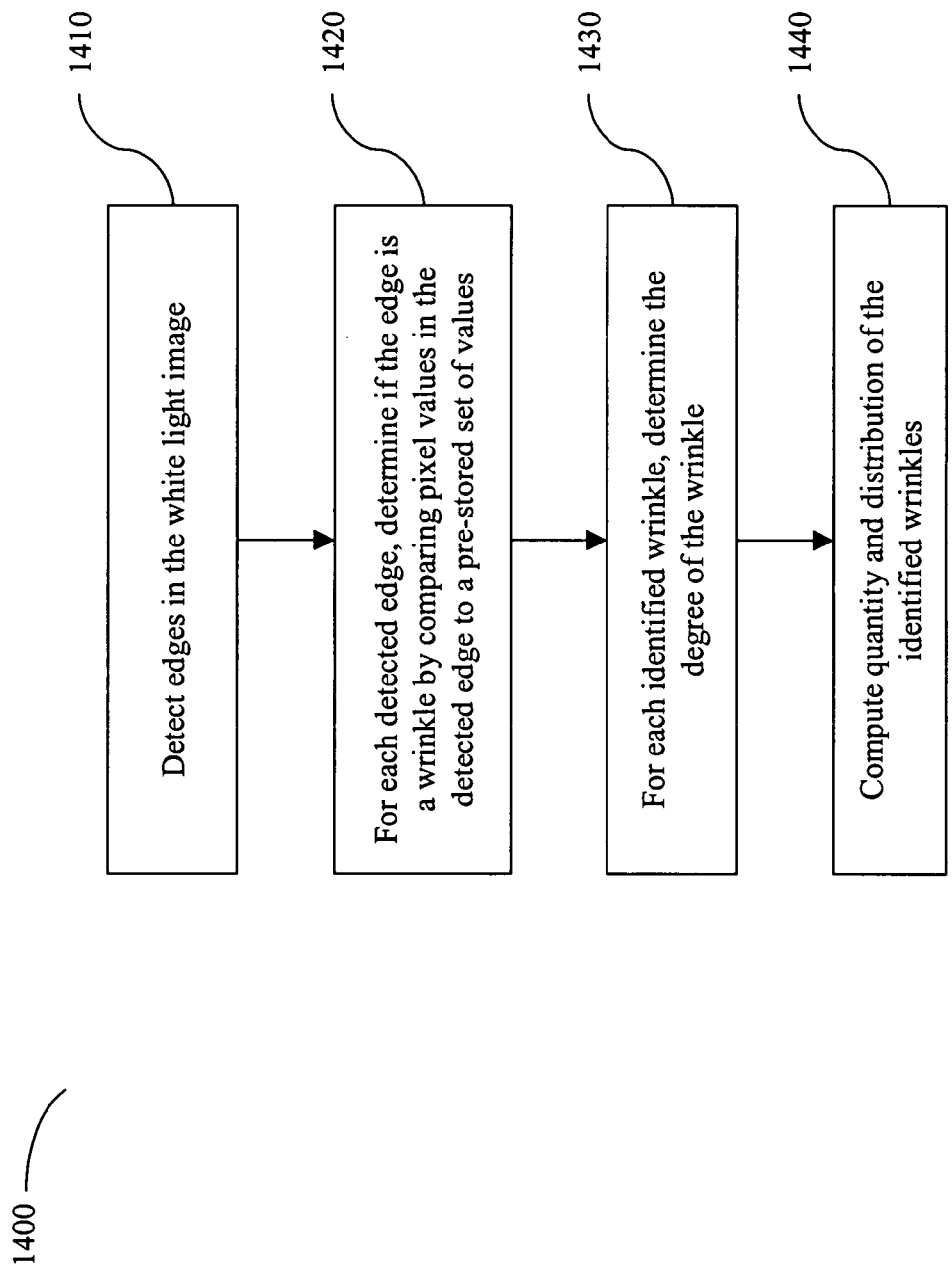
FIG. 14 is a flowchart illustrating process steps for obtaining results related to wrinkles according to one embodiment of the present invention.

In one embodiment of the present invention, submodules 1024 further includes a submodule 1400 for evaluating wrinkles on the subject 101, as shown in FIG. 14. Submodule 1400 includes a step 1410 in which a conventional or proprietary edge detector, such as the publicly available Canny edge detector, is used to detect edges in any of the white-light image after the non-skin pixels are extracted from the white-light image, and a step 1420 in which each detected edge is examined to determine if it is a wrinkle. In one embodiment, an edge is determined to be a wrinkle if a predetermined percentage of corresponding pixels have pixel values satisfy predetermined criteria. In one embodiment, the predetermined criteria are derived from prestored or recently computed skin color values for the subject. For example, average values for the read, green, and blue color channels for the subject can be used to set the criteria, and if a predetermine percentage, such as over 70% of the pixels corresponding to the edge have their red, green, and blue channel values roughly proportional to the average red, green blue channel values, the edge would be determined as a wrinkle.

Submodule 1400 may further include a step 1430 in which the pixels around the edges are examined to determine the degree of the wrinkle. For example, for a fine line wrinkle, the pixels corresponding to the edge indicating the likely presence of the wrinkle should have intensity values substantially less than those of the surrounding pixels, and for a deep wrinkle, a wider edge should be expected, and there should be a wider line of pixels having depressed intensity value.

Submodule 1400 may further include a step 1440 in which the number of all wrinkles or wrinkles of a certain degree is counted, and a distribution of the wrinkles across the subject may also be computed.

Some or all of the above exemplary results, such as those related to UV damage, skin tone, pores, and wrinkles, and any other skin condition results that can be derived from the white-light and UV image, can be used as the skin condition results in identifying the person in modules 660 and 680 in the method 600 discussed above with reference to FIG. 6. In module 660, the skin condition results are compared with respective skin condition results stored in the database 256, and in module 680 a decision is made is the person is the right person or wrong person based on the comparison.

Figure 15:
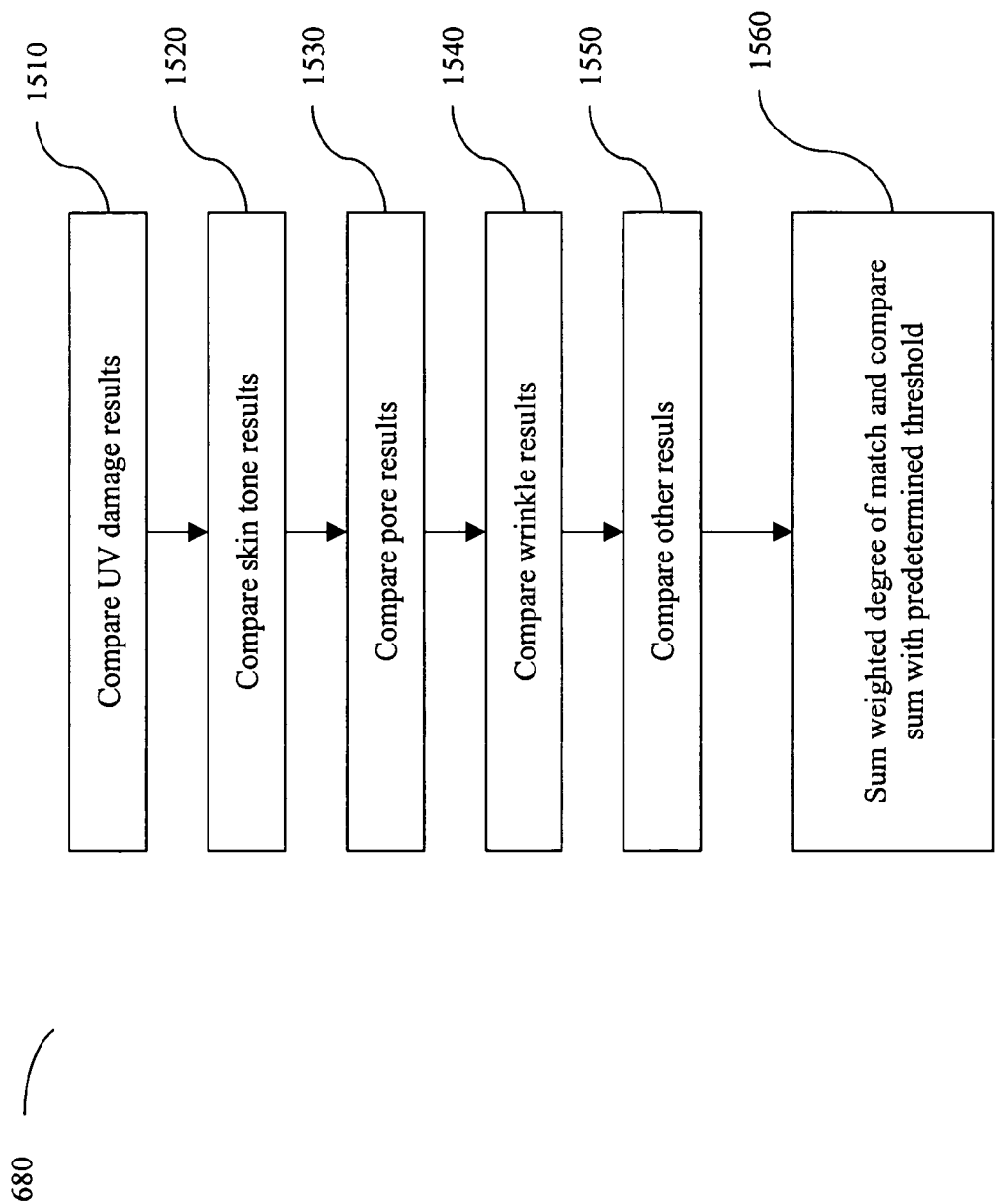
FIG. 15 is a flowchart illustrating process steps in module 680 for identifying a person according to one embodiment of the present invention.

In one embodiment, module 680 makes the decision using some or all of the process steps illustrated in FIG. 15. As shown in FIG. 15, module 680 may include a step 1510 in which the average green channel value, the first standard deviation value, and the second standard deviation value computed in steps 1120, 1130, and 1140, respectively, are compared with a prestored average green channel value, first standard deviation value, and second deviation value, respectively, associated with a known person. A degree of match, which may come in the form of a number, percentage, and/or weight, is given based on a difference measure for each result. The difference measure for a skin condition result may be defined by, for example, $$\text{Difference\_Measure} = \{[2\times(\text{Result}_{obtained} - \text{Data}_{prestored})/(\text{Result}_{obtained} + \text{Data}_{prestored})]^2\}^{1/2}$$

where, for example, $\text{Result}_{obtained}$ may be one of the average green channel value, the first standard deviation value, and the second standard deviation value computed in steps 1120, 1130, and 1140, and $\text{Data}_{prestored}$ may be a respective one of the prestored average green channel value, first standard deviation value, and second deviation value associated with the known person. The difference measure can be converted to a degree of match. For example, a degree of match of 80%, may be given if a difference measure equals to 0.2.

Module 680 may further include a step 1520 in which skin tone results are compared with prestored skin tone results of the known person, and a degree of match is obtained for each of the skin tone results, similar to those described above.

Module 680 may further include a step 1530 in which the results associated with localized skin conditions detected using the UV image, such as pores, pigmentation, moles, etc., are compared with prestored pore results of the known person, and a degree of match is obtained for each of the results, similar to those described above. For the results associated with localized skin condition, in addition to a total count of the number of affected areas for each type of the skin conditions, the locations and sizes of each affected area are also compared with respective prestored results. For example, if an affected area, such as a mole or pigmentation is found at a certain location from processing the UV image, the database 526 is searched for an affected area near the same location, and if the type of skin condition associated with the affected area is also that of a mole or pigmentation, the size and location, such as a center location, of the affected area in the database is compared with the size and location of the mole or pigmentation to obtain a degree of match for each of them. Otherwise, if the type of skin condition associated with the affected area is not a mole or pigmentation, a zero degree of match for either the size or location of the mole or pigmentation is returned.

Module 680 may further include a step 1540 in which the wrinkle results are compared with prestored wrinkle results of the known person, and a degree of match is obtained for each of the wrinkle results, similar to those described above.

Module 680 may further include a step 1550 in which the other skin condition results such as skin oil, hydration level, etc., are compared with respective prestored results of the known person, and a degree of match is obtained for each of the other skin condition results, similar to those described above.

Module 680 includes a step 1560 in which each degree of match obtained above is weighted appropriately and all of the degree of match values are summed to obtain an match sum. The match sum is compared with a predetermined threshold to determine if the person to be identified is the known person. The weight for each degree of match is chosen to reflect the importance and reliability of the respective skin condition in identifying the person. For example, a degree of match associated with a wrinkle result may be weighted less that that associated with a pore result, because the wrinkle result is determined mainly by using the white-light image and thus more subject to manipulation by someone attempting to bypass the auto-identification system.

The foregoing descriptions of specific embodiments of the present invention have been presented for purposes of illustration and description. They are not intended to be exhaustive or to limit the invention to the precise forms and procedures disclosed, and obviously many modifications and variations are possible in light of the above teaching. The embodiments were chosen and described in order to best explain the principles of the invention and its practical application, to thereby enable others skilled in the art to best use the teaching and various embodiments with various modifications as are suited to the particular use contemplated. It is intended that the scope of the invention be defined by the claims appended hereto and their equivalents.

We claim:

1. A system for automatic identifying a person using digital images, comprising:
    an image acquisition device configured to acquire a white-light image and a UV image of a portion of a body surface of the person, each of the white-light and UV images having a plurality of pixels, each pixel in the UV image corresponding to a respective pixel in the white-light image;
    a computer system configured to identify, on a pixel by pixel basis, skin-pixels in the white-light and UV images, and to obtain results associated with at least one skin condition using information in at least the UV image, the at least one skin condition including subsurface skin condition; and
    a database storing skin condition data including subsurface skin condition data associated with a known person;
    wherein the computer system is further configured to compare the obtained results with the stored skin condition results to determine if the person to be identified is the known person.

2. The system of claim 1, wherein the image acquisition device has a sensor that can be rotated to adjust an aspect ratio of the white-light or UV image according control signals from the computer system.

3. The system of claim 1, wherein the image acquisition device comprises:
    a sensor;
    an optical assembly configured to form images of the subject on the sensor; and
    a plurality of flash light sources attached thereto, including two flash light sources on two sides of the optical assembly, and one on top of the optical assembly, at least a portion of the flash light sources have UV transmission filters installed thereon, and at least a portion of the flash light sources have infrared absorption filters installed thereon.

* * * * *